United States Patent
Collins et al.

(10) Patent No.: US 6,634,699 B2
(45) Date of Patent: Oct. 21, 2003

(54) COUNTERBALANCED REAR CLOSURE FOR A VEHICLE

(75) Inventors: James Francis Collins, Farmington Hills, MI (US); Karl Simon Shargabian, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/092,806

(22) Filed: Mar. 7, 2002

(65) Prior Publication Data

US 2003/0168884 A1 Sep. 11, 2003

(51) Int. Cl.[7] .............................. B60J 5/10; B60J 5/12
(52) U.S. Cl. ........................ 296/146.8; 296/147; 296/50
(58) Field of Search ............................ 296/146.1, 147, 296/146.8, 146.13, 195, 50, 52, 53, 56, 210

(56) References Cited

U.S. PATENT DOCUMENTS

| | | | |
|---|---|---|---|
| 2,651,542 A | * 9/1953 | Meyer | |
| 2,711,343 A | * 6/1955 | Falk et al. | |
| 2,743,773 A | * 5/1956 | Weiertz | |
| 2,745,696 A | * 5/1956 | Weatherly | |
| 2,815,977 A | * 12/1957 | Podolan | |
| 3,104,910 A | * 9/1963 | Kappen | |
| 3,815,950 A | * 6/1974 | McKenzie et al. | 296/56 |
| 3,885,778 A | * 5/1975 | Deisenroth | 267/71 |
| 4,512,600 A | * 4/1985 | King | 292/338 |
| 4,546,506 A | * 10/1985 | Houle et al. | 4/555 |
| 4,630,858 A | * 12/1986 | Bez | 296/146 |
| 4,860,813 A | * 8/1989 | Ballyns et al. | 160/188 |
| 4,894,883 A | * 1/1990 | Fleischhauer | 16/66 |
| 5,921,611 A | * 7/1999 | Townsend | 296/155 |
| 6,145,917 A | * 11/2000 | Ishii et al. | 296/146.1 |
| 6,276,744 B1 | * 8/2001 | Huber et al. | 296/155 |
| 6,341,809 B1 | * 1/2002 | Chapman | 296/56 |
| 6,453,614 B1 | * 9/2002 | Rogers, Jr. et al. | 296/56 |
| 2002/0067054 A1 | * 6/2002 | Corder et al. | 296/216.01 |

OTHER PUBLICATIONS

Pending patent application USSN 09/999,088 filed Nov. 20, 2001.

* cited by examiner

Primary Examiner—D. Glenn Dayoan
Assistant Examiner—Hilary Gutman
(74) Attorney, Agent, or Firm—Laura C. Hargitt

(57) ABSTRACT

In a preferred embodiment, a dual panel vehicle rear closure assembly is actuated by a cable drive assembly. Cables push a rear panel upward from a closed position to a second position above the roof. The cables may then push both panels forward toward a third position to open a rear opening in the roof. A motor pushes the cables through channels to slide the rear panel. Free ends of cables are guided into cable return tubes. Compression assist springs in the tubes are compressed by the cables when the rear panel is in its closed position and provide a counterbalance force to assist in opening the panel. The compression springs may be shorter than the full cable. The shorter springs can be made stronger for applying the balancing forces to the lower portion of the panel travel.

10 Claims, 2 Drawing Sheets

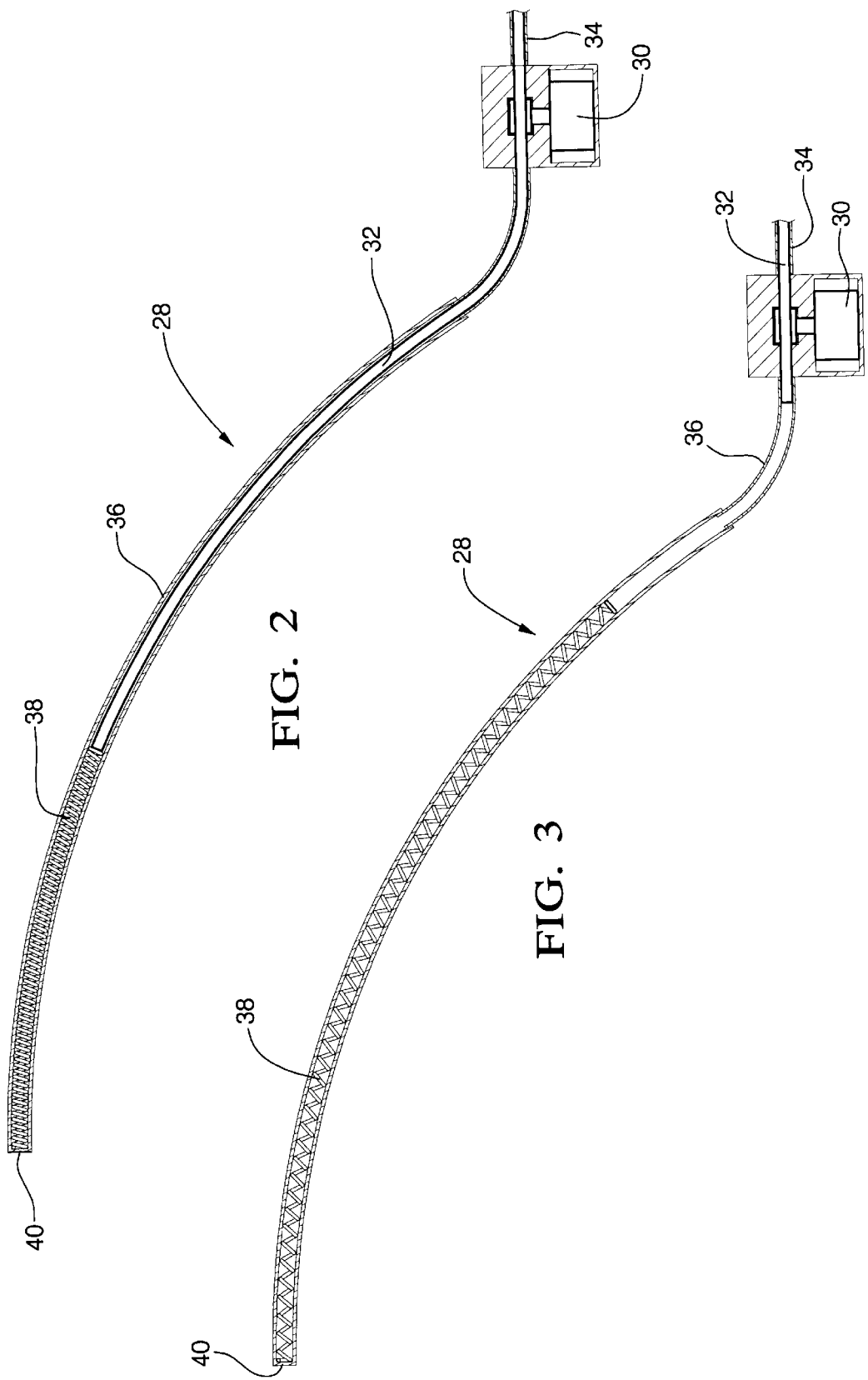

COUNTERBALANCED REAR CLOSURE FOR A VEHICLE

TECHNICAL FIELD

This present invention relates to a counterbalanced rear closure assembly for an automotive vehicle.

BACKGROUND OF THE INVENTION

It is known in automotive vehicles to employ powered sliding closure panels for providing access to the interior of the vehicle through an opening in the vehicle roof or wall. Power sun roofs and power sliding doors are examples. Another is the "clam shell" end gate on 1972 and later full size General Motors station wagons where the window was opened by sliding up into the roof while the end gate was opened by sliding down below the floor. Recent development of a rear closure assembly for selectively opening and closing a rear opening of an automotive vehicle included a sliding rear panel which is opened by sliding upward over the roof to clear the rear opening of the vehicle body. A second sliding roof panel may then be opened by sliding the rear panel forward with the roof panel to open a roof opening in the rear of the vehicle body roof.

A powered cable drive arrangement for sliding the panels between closed and open positions requires substantially greater motor power for sliding the rear panel upward to the roof than for sliding both panels forward along the roof. Accordingly, a suitable counterbalance arrangement for assisting opening of the rear panel was desired to allow use of a lighter and lower powered motor for sliding the closure assembly panels.

SUMMARY OF THE INVENTION

The present invention provides a cable drive assembly that pushes the rear panel upward from a first closed position to a second position above the roof panel to open a rear opening of the vehicle body. The cable may then push both panels forward toward a third position to open a connecting rear opening in the roof.

The cable drive assembly is patterned after prior cable drives for sun roofs and the like. A motor drives a gear that engages mating toothed cables, one on either side of the gear, and pulls or pushes them through channels so as to slide an attached rear panel from a closed to an open position and return. On the opposite sides of the motor, free ends of the cables are guided into cable return tubes. These retain the inactive portions of the cables until the motor is reversed and the cable is driven in the reverse direction to close or open the associated panel.

A feature of the present invention is that the cable drive motor is mounted at the lower rear portion of a vehicle, below the rear panel to which the cables are directly attached. Thus, operation of the motor pushes against the lower end of the rear panel to slide it upward in order to open the panel by raising it above the roof. The motor may continue to push the panel further in order to drive the rear panel, together with the roof panel, forward to open the rear roof opening, thereby providing an open bed at the rear end of the vehicle. Thus, when the panels are in their closed positions, the free ends of the cables are received in the cable return tubes, which may be located within the body of the associated vehicle. Upon opening of the panels, the cables are drawn from the return tubes by the motor and the cables are pushed against the rear panel for opening the panels of the vehicle.

Another feature of the invention is that compression assist coil springs, placed inside the cable return tubes, are compressed when the vehicle rear panel is in its closed position. These springs apply a compressive force against the free ends of the cables so as to provide a counterbalance force against the weight of the rear panel. The spring force is applied to assist the motor in opening the rear panel by raising or pushing up the rear panel to the roof position.

A further feature is that the compression springs are made only long enough to assist movement of the panel from the closed position to a point near its raised position where the force required for moving the panel is reduced and forward sliding movement of the rear and roof panels requires less force than is required for lifting the rear panel to its raised position. Thus, the compression springs are able to be made shorter and stronger for counterbalancing the high forces of lifting the rear panel but provide no assistance to the motor for moving the panels forward when they are in or near their roof locations. The result is a more even application of motor power over the full travel of the rear and roof panels which allows a smaller drive motor to be used for sliding the panels.

These and other features and advantages of the invention will be more fully understood from the following description of certain specific embodiments of the invention taken together with the accompanying drawings.

BRIEF DESCRIPTION OF THE DRAWINGS

In the drawings:

FIG. 2 is a cross-sectional view through one of the cable return tubes showing the compression counterbalance spring in the compressed condition; and FIG. 3 is a view similar to FIG. 2 showing the compression counterbalance spring in the fully extended position.

DESCRIPTION OF THE PREFERRED EMBODIMENT

Figure 1:
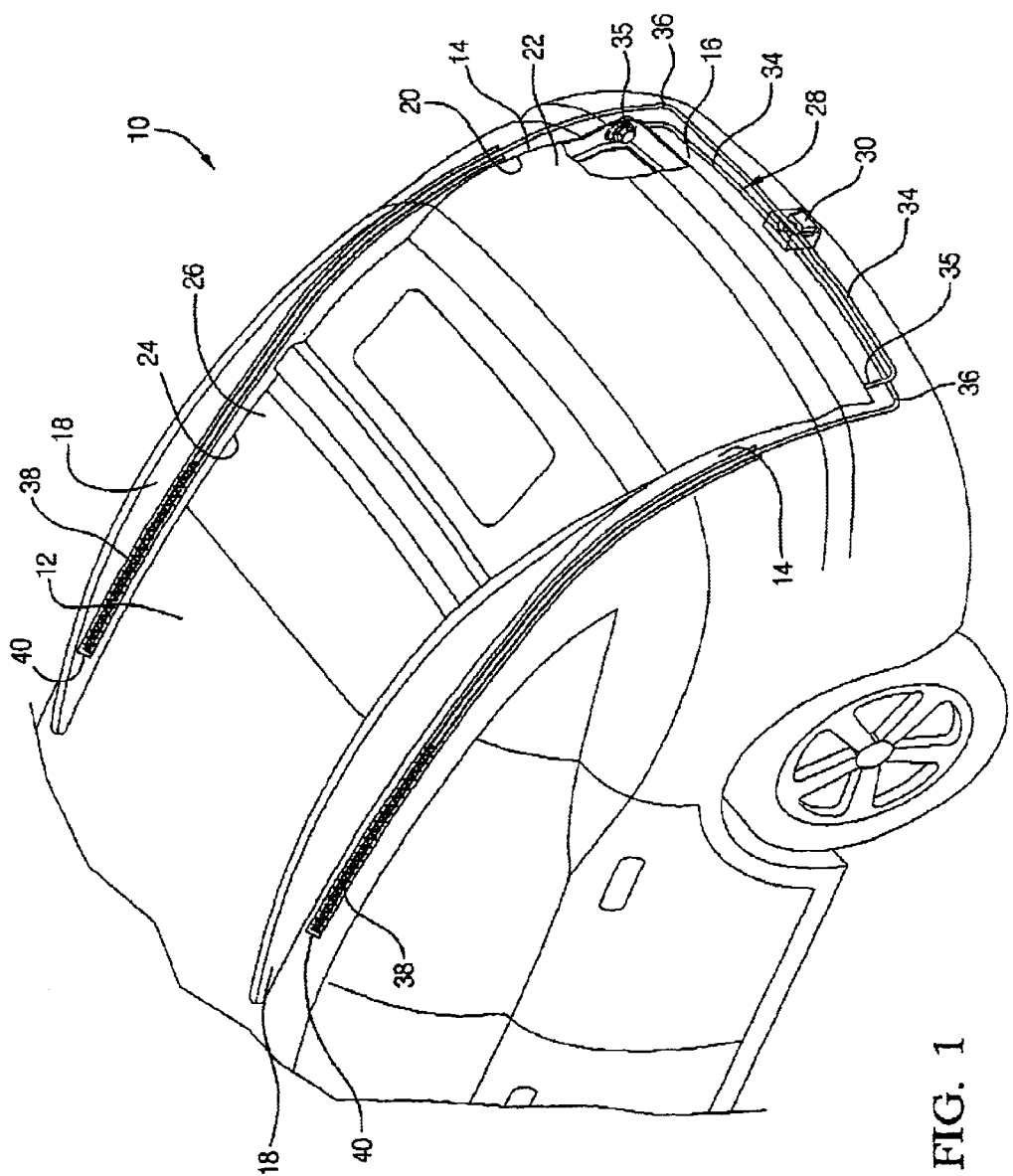
FIG. 1 is a pictorial view illustrating a dual panel assembly for an automotive vehicle having a counterbalanced cable drive system for sliding the panels in the assembly.

Referring first to FIG. 1 of the drawings in detail, numeral 10 generally indicates the body of an automotive vehicle having an enclosed cabin 12, only a portion of which is shown. Body 10 includes rear side members 14, a lower member 16 and roof side members 18. A stationary roof panel and side panels for the body are omitted for clarity.

The lower and rear side members 14,16 define a rear opening 20 closed by a rear panel 22. The rear panel is slidable, in tracks not shown, from its closed first position up to a second position between the roof side members 18 in which the rear opening 20 is uncovered so that the rear end of the cabin is open to the exterior of the vehicle. At the rear of the roof, a roof opening 24 is provided which, as shown in FIG. 1, is closed by a moveable roof panel 26. When the rear panel 22 is moved to its second position, it engages the roof panel 26 so that further movement of the rear panel forward carries with it the roof panel 26 until the panels are moved sufficiently forward to uncover the roof opening 24. This opens an area above the floor of the vehicle cabin to the exterior of the vehicle, thereby providing an open cargo area at the rear end of the vehicle.

In accordance with the invention, the panels are slid open and closed by a drive cable assembly 28. Assembly 28 includes a drive motor 30 located in any convenient location, preferably centered below or behind the lower body member 16. Drive motor 30 drives a gear, nor shown, which connects, through interengaging teeth in a conventional manner, with a pair of drive cables 32, only one of which is shown in FIGS. 2 and 3. Cables 32 extend through channels or drive tubes 34 to attachment points 35 on opposite sides of the lower end of rear panel 22 where the cables enter grooves, not shown, in the rear side members 14.

Motor 30 also connects with return tubes 36 into which the free ends of the drive cables 32 are received when the rear panel 22 is lowered to its closed position shown in FIG. 1. The return tubes 36 are positioned within the vehicle body at any convenient location, for example, adjacent to the rear side members 14 of the body.

In accordance with the invention, the return tubes 36 are provided with compression counterbalance springs 38 which are secured at or contained by outer ends 40 of the return tubes. When the rear panel 22 is in its first closed position, cables 32 extend into their respective return tubes 36, engaging inner ends of the compression springs 38 and compressing the springs within the tubes as shown in FIG. 2. The springs are selected to provide a compression force against the free ends of cables 32 which counterbalances a portion of the weight of the rear panel 22 when it is in or near its lower first position. FIG. 3 shows the position of the cables 32 and springs 38 when the rear panel has been raised and advanced to its full forward position. In this position, springs 38 are fully extended and no longer in contact with the cables 32 which have been further advanced in moving the panels to a third fully open position.

In operation, springs 38 exert an opening force through cables 32 against the rear panel 22 when the panel is in the closed position and the springs 38 are fully compressed. As the rear panel is raised by actuation of the motor 30, springs 38 expand, assisting the motor in sliding panel 22 from its closed first position to a raised second position where the rear opening 20 is cleared and the cabin of the vehicle is open through the rear end to the exterior of the vehicle. At this point, or somewhere in between as is desired, springs 38 reach their fully extended positions and no longer apply a counterbalancing force against the rear panel 22.

As the panel is raised, the counterbalance force diminishes until the point is reached at which springs 38 are no longer engaged with the ends of their associated cables 32. Thereafter, further advancement of the rear panel and sliding forward of the roof panel therewith is accomplished solely by the force of the drive motor 30 driving the cables and pushing the panels toward their full forward positions. This forward motion requires less force since the panels are not being lifted in a significant way at this point but are primarily moving in a generally horizontal direction so that assistance of the counterbalance springs 38 is no longer needed.

When the panels are to be returned to their closed positions, motor 30 is actuated to pull the rear panel downward which draws the roof panel with it until the roof panel reaches its closed position, closing the roof opening 24. Further drawing of the rear panel downward by the motor is assisted by the weight of the rear panel itself as it slides in a downward direction, but is opposed by the counterbalance springs which begin to be compressed by contact with the free ends of the cables 32. As the rear panel 22 is then lowered to its closed position, the springs 38 are compressed until they reach the maximum compression position as illustrated in FIG. 2.

As has been shown with an exemplary embodiment, the invention provides a simple counterbalance arrangement for offsetting some of the weight of an upwardly sliding panel as applied to the rear end of an automotive vehicle. Other vehicle applications may also be contemplated, such as for a truck body side closure panel wherein the panel is driven by a cable drive assembly.

The improved assembly includes the use of compression springs placed within cable return tubes utilized for receiving the free ends of cables of the cable drive assembly. The compression springs are sized and of sufficient force to provide substantial counterbalancing of the weight of the rear panel with lessening of the counterbalance force as the panel is raised from a generally vertical to a generally horizontal position. For movement in a further horizontal direction, the counterbalance springs are separated from the drive cables when the springs are extended to their fully relaxed positions. Thus the springs may be made shorter and stronger with a length which supplies counterbalance forces appropriate to the position of the associated rear panel and adequate for counterbalancing initial lifting forces. The shortened spring length allows the springs to be designed with greater force effective for the raising of the rear panel. Thus, the length of spring compression is less than the length of cable travel in the system so that the spring need not be designed for the total travel of the drive cables.

While coil springs are particularly well suited for use inside the cable return tubes, other forms of springs may also be contemplated as alternatives for use in the cable drive assembly. Also, while the exemplary vehicle body disclosed has a curving rear end suited for sliding a rear panel along a curved path between primarily vertical and primarily horizontal positions, other end or panel configurations could be utilized in the invention. For example, a panel could rise generally vertically and then rotate more quickly to a horizontal position. Alternatively, a segmented panel, such as is common in garage-doors, could be driven by the cable drive of the invention.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A closure assembly for a vehicle, the assembly including:
   at least one closure panel slidable upward from a lower closed to an upper open position in a path beginning in a first direction having a major vertical component and ending in a second direction having a major horizontal component; and
   a cable drive assembly connected for sliding the panel between the closed and open positions, the cable drive assembly comprising:
   a drive motor;
   at least one laterally contained drive cable having a free end and an opposite drive end connected with the panel for pushing the panel upward and pulling the panel downward by linear motion of the cable, the cable being drivably engaged by the drive motor intermediate the ends for driving the cable linearly in either of said directions; and
   a compression spring laterally contained and disposed linearly adjacent the free end of the cable, the spring having a contained distal end and an opposite near end engagable with the free end of the cable over at least a portion of the length of linear cable travel, the spring being compressed to a maximum force when the panel is in the lower closed position and extended to an uncompressed length when the cable is in the upper open position;

whereby the vertical component of panel motion is counterbalanced, at least in part, by the maximum force of the spring when the panel is closed and the counterbalance force diminishes as the panel is raised to the open position.

2. A closure assembly as in claim 1 wherein the free end of the cable is received in a cable return tube and the compression spring is disposed at an end of the return tube.

3. A closure assembly as in claim 1 wherein the spring has a length substantially shorter than the travel of the panel and is separated from the cable in an extended portion of travel of the cable, the spring exerting a counterbalance force only during a lower portion of the travel of the panel.

4. A closure assembly as in claim 3 wherein the free end of the cable is received in a cable return tube and the compression spring is disposed in the return tube.

5. A closure assembly as in claim 4 wherein the compression spring is linearly contained by an end of the return tube.

6. A closure assembly for a vehicle, the assembly including:

at least one closure panel slidable upward from a lower closed to an upper open position in a path beginning in a first direction having a major vertical component and ending in a second direction having a major horizontal component; and a cable drive assembly connected for sliding the panel between the closed and open positions, the cable drive assembly comprising:

a drive motor;

a pair of laterally contained drive cables each having a free end and an opposite drive end connected with a lower edge of the panel for pushing the panel upward and pulling the panel downward by linear motion of the cable, the pair of cables being drivably engaged by the drive motor intermediate the ends for driving the pair of cables linearly in either of said directions; and a compression spring for each of the cables laterally contained and disposed linearly adjacent the free end of each of the cables, each spring having a contained distal end and an opposite near end engagable with the free end of each of the cables over at least a portion of the length of linear cable travel, the springs being compressed to a maximum force when the panel is in the lower closed position and extended to an uncompressed length when the cables are in the upper open position and assisting in counterbalancing the weight of the panel in at least a lower portion of its motion along the path.

7. A closure assembly for a vehicle, the assembly including:

at least one closure panel slidable upward from a lower closed to an upper open position in a path beginning in a first direction having a major vertical component and ending in a second direction having a major horizontal component; and a cable drive assembly connected for sliding the panel between the closed and open positions, the cable drive assembly comprising:

a drive motor, a pair of laterally contained drive cables each having a free end and an opposite drive end connected with laterally opposite edges of the panel for pushing the panel upward and pulling the panel downward by linear motion of the cable, the pair of cables being drivably engaged by the drive motor intermediate the ends for driving the pair of cables linearly in either of said directions; and a compression spring for each of the cables laterally contained and disposed linearly adjacent the free end of each of the cables, each spring having a contained distal end and an opposite near end engagable with the free end of each of the cables over at least a portion of the length of linear cable travel, the springs being compressed to a maximum force when the panel is in the lower closed position and extended to an uncompressed length when the cables are in the upper open position and assisting in counterbalancing the weight of the panel in at least a lower portion of its motion along the path.

8. A closure assembly as in claim 1 wherein the panel is a rear panel positioned to close a rear opening of the vehicle and the rear panel is slidable upward adjacent a roof to clear the rear opening.

9. A closure assembly as in claim 8 including a slidable roof panel engagable by the rear panel upon clearing of the rear opening, both the roof and the rear panels being slidable further forward to clear a rear roof opening adjoining the rear opening.

10. A closure assembly as in claim 1 wherein the drive motor is fixed to a stationary portion of the vehicle located below the rear opening.

* * * * *